(12) United States Patent
Cippitani

(10) Patent No.: US 9,194,289 B2
(45) Date of Patent: Nov. 24, 2015

(54) PRESSURE REDUCER-REGULATOR FOR FEEDING INTERNAL COMBUSTION ENGINES WITH METHANE OR OTHER SIMILAR FUELS

(75) Inventor: Luciano Cippitani, Nettuno (IT)

(73) Assignee: ICOMET S.P.A., Latina (LT) (IT)

( * ) Notice: Subject to any disclaimer, the term of this patent is extended or adjusted under 35 U.S.C. 154(b) by 33 days.

(21) Appl. No.: 14/112,936

(22) PCT Filed: Apr. 18, 2012

(86) PCT No.: PCT/IT2012/000112
§ 371 (c)(1),
(2), (4) Date: Jan. 8, 2014

(87) PCT Pub. No.: WO2012/143962
PCT Pub. Date: Oct. 26, 2012

(65) Prior Publication Data
US 2014/0109859 A1    Apr. 24, 2014

(30) Foreign Application Priority Data

Apr. 21, 2011    (IT) .............................. RM2011A0203

(51) Int. Cl.
*F02B 77/00*    (2006.01)
*G05D 16/20*    (2006.01)
*F02M 21/02*    (2006.01)

(52) U.S. Cl.
CPC ............ *F02B 77/00* (2013.01); *G05D 16/2033* (2013.01); *F02M 21/0209* (2013.01); *F02M 21/0239* (2013.01)

(58) Field of Classification Search
CPC .......... F02M 21/0239; F02M 51/0671; F02M 59/366; F02M 69/54; F02M 37/0029; F02M 59/462; F02M 21/0254; F02M 37/00; F02M 17/147; F02M 21/0215; F02M 59/34; F02M 63/0017; F02M 63/0052; F02M 69/044
See application file for complete search history.

(56) References Cited

U.S. PATENT DOCUMENTS 2,409,611 A * 10/1946 Bodine .......................... 123/527
3,905,345 A *  9/1975 Nakada et al. ............... 261/39.1
4,520,785 A *  6/1985 Batchelor ..................... 123/525

(Continued)

FOREIGN PATENT DOCUMENTS

EP        0248411 A2     12/1987
FR        2859502 A1 *    3/2005

OTHER PUBLICATIONS

International Search Report in Corresponding PCT Application, Dated Aug. 8, 2012.

*Primary Examiner* — Marguerite McMahon
*Assistant Examiner* — Tea Holbrook
(74) *Attorney, Agent, or Firm* — Hedman & Costigan, P.C.; James V. Costigan; Kathleen A. Costigan

(57) ABSTRACT

The object of the present invention is a methane pressure reducer/regulator for feeding internal combustion engines which comprises a body divided into three chambers, communicating with each other by means of high resistance conduits and by means of an opening/closing element which is integral with an elastic diaphragm, whose surface is proportionally larger than the opening/closing element so that a modest pressure in the chamber upstream from the elastic diaphragm is sufficient to bend it, overcoming both the methane pressure resistance in the adjacent chamber, and the methane pressure resistance in the chamber directly connected to the tank(s), as well as the counter spring resistance. When the elastic diaphragm bends, it pushes a stem whose end is integral with the opening/closing element that allows or prevents the methane passage through a hole connecting the chamber from which methane is sent to the engine to the chamber wherein methane comes directly from the tank(s). Further, a conduit connects the chamber where a sufficient pressure is reached to bend the diaphragm, to the chamber from which low pressure methane is sent to the feeding system of the engine; according to a configuration, said conduit is provided with an on-off valve and a throat, or, alternatively, only with the on-off valve. The pressure regulator/reducer is completed by a pressure sensor, a pressure control valve, valves and connections to electronics which controls the engine feeding operation.

10 Claims, 2 Drawing Sheets

(56) References Cited

U.S. PATENT DOCUMENTS

| | | | |
|---|---|---|---|
| 4,534,913 A * | 8/1985 | Bathe | 261/34.3 |
| 4,841,941 A * | 6/1989 | Parietti | 123/527 |
| 2005/0051912 A1 | 3/2005 | Knaus | |
| 2006/0213488 A1 * | 9/2006 | Post et al. | 123/527 |
| 2008/0022983 A1 * | 1/2008 | Martindale | 123/575 |
| 2008/0029072 A1 * | 2/2008 | Ceratto | 123/527 |
| 2009/0120412 A1 * | 5/2009 | Tokuo et al. | 123/506 |
| 2011/0129363 A1 * | 6/2011 | Sakai et al. | 417/289 |

* cited by examiner

PRESSURE REDUCER-REGULATOR FOR FEEDING INTERNAL COMBUSTION ENGINES WITH METHANE OR OTHER SIMILAR FUELS

The object of the present invention is a methane pressure reducer/regulator for feeding internal combustion engines.

The pressure reducer/regulator of the present invention comprises a body divided into three chambers, which are communicating with each other by means of high resistance conduits and by means of an opening and closing element which is integral with an elastic diaphragm, whose surface is proportionally larger than the opening/closing element so that a modest pressure within the chamber upstream from the elastic diaphragm is sufficient to bend it, overcoming both the methane pressure resistance present in the chamber and the methane pressure resistance present in the chamber directly connected to the tank(s) as well as the counter spring resistance. When the elastic diaphragm bends, it pushes a stem whose end is integral with the opening/closing element that allows or prevents the methane passage through a hole connecting the chamber from which the methane is sent to the engine with the chamber where methane comes directly from the tank(s). Further, a conduit connects the chamber where a sufficient pressure is reached to bend the diaphragm, to the chamber from which the low pressure methane is sent to the feeding system of the engine; according to a configuration, said conduit is provided with an on-off valve and a throat or, according to another configuration, only with the on-off valve. The pressure regulator/reducer of the present invention is completed by a pressure sensor, a pressure control valve, valves and connections to electronics controlling the engine feeding operation.

PRIOR ART

Currently a methane system for feeding internal combustion engines schematically consists of:
- At least one methane tank (cylinder) able to maintain gaseous state methane compressed at a pressure of about 220 bar;
- A safety valve which allows to isolate the methane tank from the system for maintenance;
- A charging methane union which allows to carry out the methane refueling in the tank having a non-return valve;
- A pressure reducer/regulator which is configured to lower the methane pressure from the one present in the tank to the feed pressure of the engine, for example of 1.0/2.0 bar;
- A solenoid valve which stops the methane flow when the engine is off;
- An electronic control unit which maintains the correct feed parameters.
- A rail which carries the gas to the injectors;
- A pressure gauge which informs the electronic control unit;
- A commutator.

Essential to the system operation is the pressure reducer which has to reduce the methane pressure present in the tank to the value required for the engine operation, as mentioned about 1.0/2.0 bar, and it has to ensure that the needed fuel amount at the correct pressure is, on request, always available, quickly adapting it as the operating conditions vary.

An example of this need is to provide the required methane amount at the correct pressure when overtaking another vehicle.

The reducers/regulators currently used in internal combustion engines include two or three pressure stages, accomplished with springs and diaphragms and/or pistons having springs, the last stage of which is the type with vacuum output and their operation is usually determined by a spring.

One of the problems of these reducers is that their operation is dependent on the operation of mechanical components such as springs, spring retainers, diaphragms, pistons and adjusting screws of the outlet pressure; these mechanical components can lose their functionality and setting, thus causing the reducer/regulator malfunctioning.

A further problem is caused by the fact that the reducers/regulators currently on the market, being based on the operation of mechanical devices, cannot continuously vary the methane pressure delivered to the engine feeding system according to the power requests or sudden accelerations, or under use conditions which request little pressure, but they merely provide methane at a constant pressure which can lead to:
a) Power losses in case of quick acceleration;
b) Excessive consumption when, while travelling, a modest pressure is requested, for example, at constant speed or under particularly favorable conditions.

An example of reducer is disclosed in the U.S. Pat. No. 4,534,913 Bathe John G, which describes a pressure regulator-reducer for internal combustion engines which does not solve the problems of mechanical simplicity, rapidity and accuracy of regulator control;

FR 2 859 502 describes a carburettor assembly which comprises a carburettor and an accelerator pump.

EP 0 248 411 describes a regulator assembly for internal combustion engines which comprises a diaphragm, a pressure adjusting chamber, a valve seat in the pressure adjusting chamber.

The devices of the Patents FR 2 859 502, EP 0 248 411 differ from that described in claim 1 and do not show the features of claim 1.

DESCRIPTION OF THE INVENTION

The object of the present invention is a pressure reducer/regulator for feeding internal combustion engines with methane or other similar fuels, wherein the mechanical components are extremely reduced and essentially include the counter spring of the opening/closing element of the methane inflow into the chamber from which it is sent to the engine feeding system.

The reducer/regulator body of the present invention is divided into three chambers interconnected by means of conduits and/or devices allowing the opening/closing of a hole for the methane passage, so as that within the chamber, from which methane is sent to the engine feeding system, the pressure required for the correct engine operation is always available, even if the methane pressure in the tank(s) is at its maximum or decreases after consumption, or in case of engine feeding system requests due to sudden accelerations.

The regulator/reducer of the present invention provides that the pressure methane coming from the tank is sent to a first chamber from which, by means of a pressure control valve regulated by an electronic control unit, methane is introduced into a second smaller chamber which is separated from the chamber distributing methane to the engine by an elastic diaphragm having a wide surface; methane is introduced into the smaller chamber at such a pressure able to bend the elastic diaphragm which, through a stem, controls the opening of the communicating hole between the inlet methane chamber and the chamber distributing methane to the engine feeding system.

As mentioned, the second smaller chamber is separated from the distributing chamber by an elastic diaphragm that bends under the methane pressure present in the second smaller chamber when the methane pressure within the chamber distributing methane to the engine feeding system decreases for sudden needs of power request to the engine, for example a sudden acceleration.

The elastic diaphragm pushes the stem into an opening on the wall separating the chamber configured to distribute methane to the feeding system from the chamber housing the methane from the tank(s); as the stem goes on, it causes the departure of a closing means and lets free the hole through which methane flows directly and immediately into the chamber distributing it to the feeding system, until the request ends, or, until the pressure within the second chamber becomes equal to the pressure within the chamber distributing methane to the feeding system. Once the request has ended, the elastic diaphragm recovers its position, draws the stem and therefore the closing means blocks the communicating hole and stops the methane passage assisted by the action of a spring.

In order to allow the elastic diaphragm bending and therefore the displacement of the stem, whose end is integral with a shutter allowing or preventing the opening/closing, the elastic diaphragm surface is proportionally larger than the shutter surface.

To rebalance the pressure between the smaller chamber and the chamber distributing methane to the engine feeding system, a conduit is provided which may have an on-off/control valve regulated by the electronic control unit and a suitably sized throat to allow a slow downflow of the methane pressure between the smaller chamber and the chamber distributing methane to the engine feeding system; alternatively, the conduit may only have the on-ff/control valve controlled by the electronic control unit.

DESCRIPTION OF THE DRAWINGS

The pressure reducer/regulator for feeding internal combustion engines with methane of the present invention will be now described with reference to the attached drawings in which.

DESCRIPTION OF AN EMBODIMENT

Figure 1:
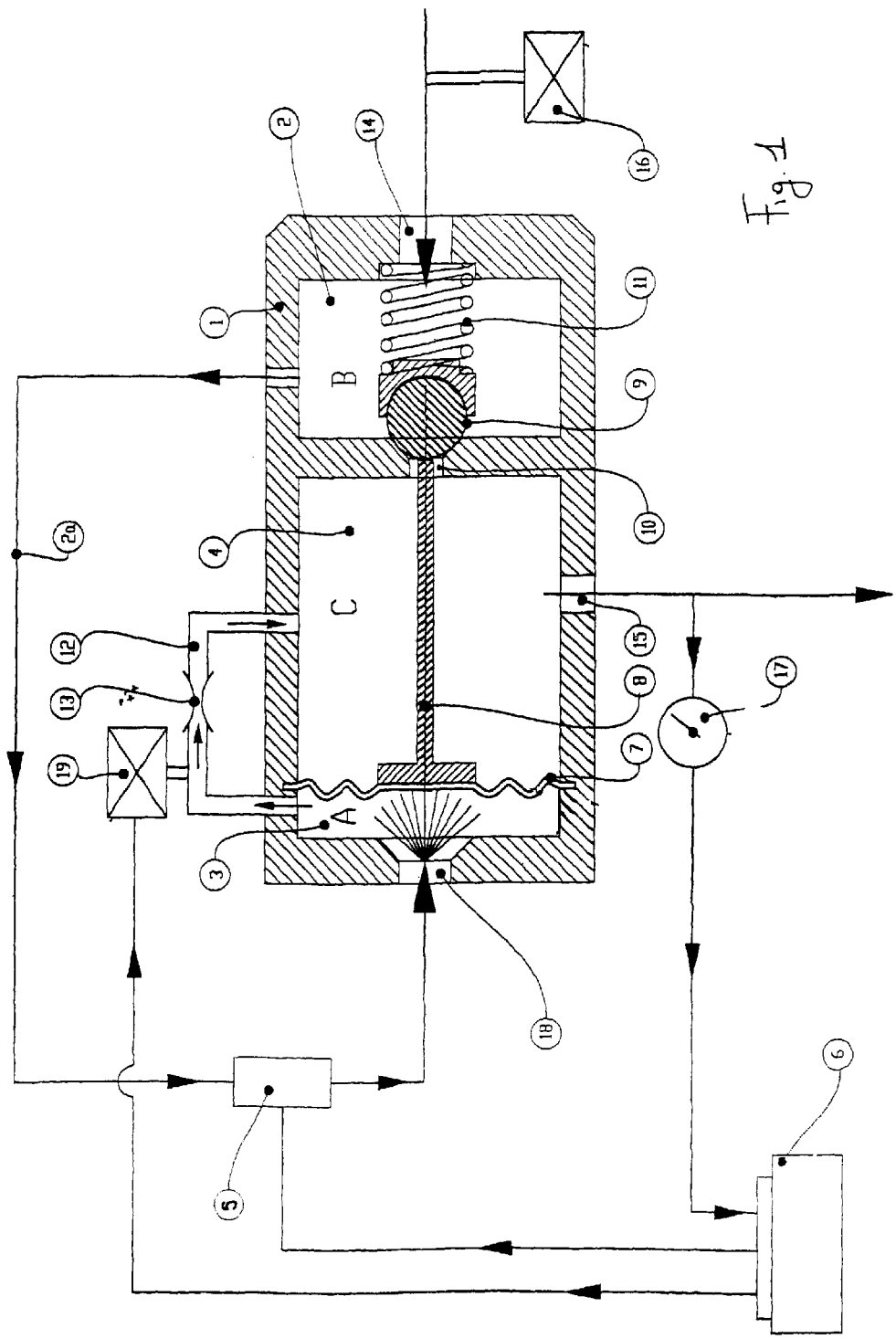
FIG. 1 shows a schematic embodiment, which is not limiting, of a possible realization.

With reference to the attached drawings, the regulator/reducer for feeding internal combustion engines with methane of the present invention consists of:

A body (1) divided into three chambers:
A chamber (2) which receives methane from the tank
A smaller chamber (3) which receives methane from chamber (2)
A larger chamber (4) which receives methane from chamber (3), and depending on requests, from chamber (2) and sends it to the engine feeding system Beside the body (1) divided into three chambers (2, 3, 4), the regulator/reducer comprises:
A high-pressure adduction methane conduit (2a) from chamber (2) to chamber (3)
A pressure control valve at high-pressure (5) for the methane adduction into chamber (3)
An electronic control unit (6) for adduction controlling into the chamber (3)
An elastic diaphragm (7) separating chamber (3) from chamber (4); said elastic diaphragm has a proportionally larger surface than the shutter surface placed within chamber (2) and moved away from the elastic diaphragm (7) by means of a stem, the function of said shutter is to open or close the hole for the methane passage from chamber (2) to chamber (4).
A stem (8) integral with the elastic diaphragm (7) on one side and with a shutter (9) on the other side; said stem (8) has such a length that, when the elastic diaphragm (7) is in its resting position, the shutter (9) fully sticks to the walls of an opening (10) connecting chamber (4) to chamber (2), said walls of the opening (10) being provided with a gasket or metal-to-metal seal.
An elastic counter means (11) for the return of the shutter (9) to its closing position.
A conduit (12) which connects chamber (3) to chamber (4), and which has devices apt to adjust or stop the methane passage.
A throat (13) on the conduit (12) and/or an on-off/control solenoid valve (19) as adjusting elements of the methane passage.
An opening (14) which allows the methane adduction to chamber (2) from the tank(s)
An opening (15) which allows the methane adduction to the engine feeding system
An on-off valve (16) on the methane adduction conduit from the tank(s)
A pressure sensor (17) between the methane adduction conduit to the engine feeding system and the electronic control unit (6) which controls the pressure control valve (5) of the methane adduction into chamber (3) and the on-off/control valve (19)
An opening (18) for the methane adduction into chamber (3) from the pressure control valve (5)

The reducer/regulator operation of the present invention will be described below.

The chamber (2) of the body (1) of the pressure reducer/regulator receives through the opening (14) the methane coming from the tank(s) at a pressure proportional to the tank load level, about 220 bar with a full tank and about 10 bar with an almost empty tank.

By means of the adduction conduit (2a) and the high pressure control valve (5), controlled by the electronic control unit (6) which monitors gas requests from the engine through a pressure sensor (17), the methane is sent from chamber (2) to chamber (3) which is very small in size. Within chamber (3), because of its small size, the pressure required for the opening of the shutter (9) is quickly and easily reached.

The chamber (3) and the chamber (4) are communicating by means of the conduit (12) having devices apt to choke or prevent the methane passage, said devices, depending on the configuration, comprise an on-off/control valve (19) and an eventual throat (13).

Figure 2:
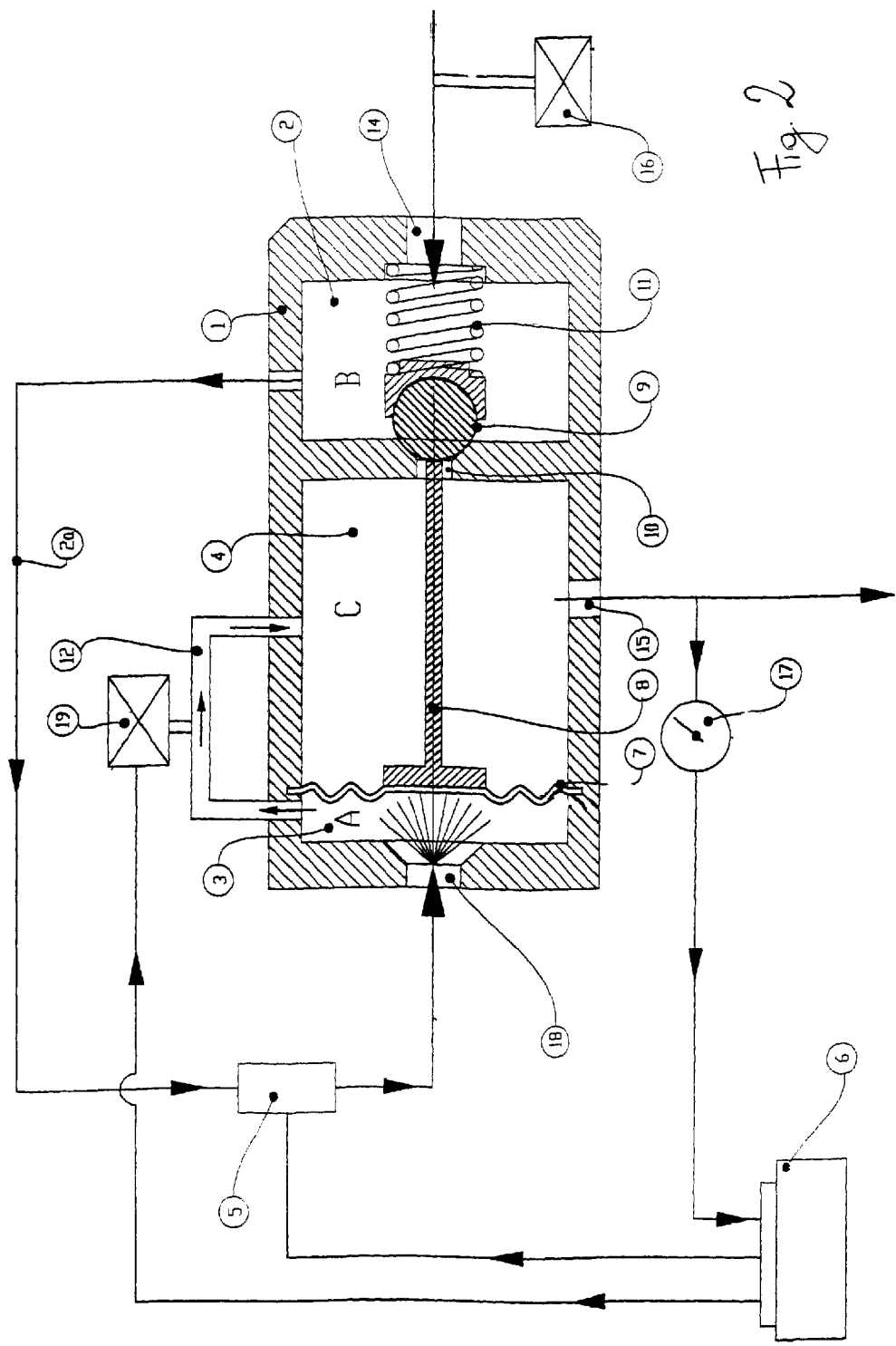
FIG. 2 shows a variant of the embodiment of FIG. 1.

The on-off/control valve (19) receives the opening/closing adjustment control by the electronic control unit (6) which processes data received from the pressure sensor (17), thus preventing the methane from passing when pressure within chamber (4) exceeds the predetermined operating pressure of the engine feeding system or choking the pressure so as to maintain it constant during the use (FIG. 2).

In addition to the on-off/control valve (19), a gauged throat (13) on the conduit (13) may be provided in order to limit the use of the on-off/control valve (19) to the closing need (FIG. 1).

When within chamber (4) the pressure detected by the pressure sensor (17) suddenly decreases, e.g. for a greater request by the engine, the pressure control valve (5), controlled by electronics (6), injects methane into chamber (3), quickly reaching the pressure required for bending the elastic diaphragm (7) which pushes the stem (8), with the consequent departure of the shutter (9) from the walls of the hole (10) and the direct methane passage from chamber (2) to chamber (4) in the required quantity.

Once the request has been satisfied and the pressure within chamber (4) has returned to the predetermined values, the elastic diaphragm (7) recovers its resting position, draws back the stem (8) and the shutter (9) which closes the hole (10), being pushed by the pressure in chamber (2) and by the elastic means such as a spring (11).

The on-off/control valve (19) is closed by the electronic control unit (6) when the pressure sensor (17) detects a high request for use, this causes that within chamber (3), which is, as mentioned, very small in size, the pressure required for bending the elastic diaphragm (7) is quickly reached, with the displacement of the stem (8) and shutter (9) and the consequent fast opening of the hole (10) with the methane passage from chamber (2) to chamber (4).

The presence of the throat (13) and/or the on-off valve (19) on the conduit (12) connecting chambers (3) and (4) allows both, as mentioned, to achieve a quick pressure increase within chamber (4), in cooperation with the other present devices, in order to satisfy the request coming from a sudden increase of stress and number of revolutions of the engine, and to maintain the pressure within chamber (4) at minimum levels, therefore even lower than 1 bar when the engine request is minimum because travel conditions are favorable.

The ability to automatically adjust the increase of the feeding pressure and to adjust the minimum delivery pressure of the methane gas to the engine cannot be obtained with the pressure reducers/regulators currently on the market whose setting of the delivery pressure is accomplished by the manufacturer.

The invention claimed is:

1. Pressure regulator/reducer for feeding internal combustion engines with methane characterized in that it consists of:
    a body (1) divided into three chambers (2, 3 and 4) each of them having three different inner volumes and wherein chamber (3) has a smaller volume than chamber (2), and chamber (2) has a smaller volume than chamber (4);
    a supply methane conduit from tank(s) to chamber (2) through a hole (14) on the wall of chamber (2);
    an on-off valve (16) of the outlet methane from the tank(s);
    a connecting conduit (2a) of chamber (2) to chamber (3);
    a pressure control valve (5) on the connecting conduit (2a);
    a connecting conduit (12) of chamber (3) to chamber (4);
    adjusting and/or closing devices of the connecting conduit (12);
    a hole (10) of methane passage between chamber (2) and chamber (4);
    a shutter (9) to open and close the hole (10) of the methane passage between chamber (2) and chamber (4) connected to a stem (8), whose opposite end is integral with an elastic diaphragm (7);
    the elastic diaphragm (7) which separates chamber (3) from chamber (4), having a proportionally larger surface than the surface of the shutter (9) that opens and closes the hole (10) of the methane passage between chamber (2) and chamber (4);
    an elastic means (11) which cooperates with the methane pressure in chamber (2) in order to keep the shutter (9) sticking to the hole (10);
    a hole (15) in chamber (4) for feeding the methane to the engine;
    a pressure sensor (17) placed on the connection to the engine feeding system;
    an electronic control unit (6) connected to the pressure sensor (17) and to the adjusting and closing devices of the connecting conduit (12) and to the pressure control valve (5);
    sealing gaskets located at the hole (10);
    wherein during the use:
    the methane gas pressure within chamber (2) is equal to pressure in the tank(s);
    the methane gas pressure with chamber (3) is equal or lower than pressure within chamber (2);
    the methane gas pressure within chamber (3) is equal or lower higher than pressure within chamber (4);
    the methane gas pressure within chamber (4) is equal to pressure required for the engine feeding.

2. Pressure regulator/reducer for feeding internal combustion engines with methane according to claim 1, characterized in that the methane pressure in chamber (4) is kept equal to the pressure required for the engine feeding by means of:
    a continuous adjustment of the methane pressure within chamber (3) which is continually varied by the pressure control valve (5), on request of the electronic control unit (6) that receives data of the pressure required for use from the pressure sensor (17);
    the connecting conduit (12) provided with adjusting and closing devices of chamber (3) with chamber (4);
    the methane inflow from chamber (2) to chamber (4), when the methane pressure in chamber (3) is higher than the methane pressure in chamber (4) with such a value as to bend the elastic diaphragm (7), displace, by means of the stem (8), the shutter (9) from the hole (10) overcoming the resistance of methane pressure in chamber (2) and of the elastic means (11), thus allowing the direct methane inflow from chamber (2) to chamber (4).

3. Pressure regulator/reducer for feeding internal combustion engines with methane according to claim 2 characterized in that the opening and closing times of the pressure control valve are set by the electronic control unit (6) according to the pressure values required for the engine use which are detected by the pressure sensor (17).

4. Pressure regulator/reducer for feeding internal combustion engines with methane according to claim 2 characterized in that the adjusting and closing devices of the methane pressure in the conduit (12) connecting chamber (3) to chamber (4) consist of an on-off valve (19) placed on the conduit (12) and connected to the electronic control unit (6).

5. Pressure regulator/reducer for feeding internal combustion engines with methane according to claim 4 characterized in that the closing of the on-off valve (19) on the conduit (12) connecting chamber (3) to chamber (4) allows to reach a quick pressure increase in chamber (3), the bending of the elastic diaphragm (7) and the displacement of the stem (8) with the consequent opening of the hole (10) and a methane pressure increase in chamber (4), in cooperation with the other present devices, to satisfy the request coming from a sudden increase of stress and number of revolutions of the engine.

6. Pressure regulator/reducer for feeding internal combustion engines with methane according to claim 2 characterized in that the adjusting and closing devices of the methane pressure in the conduit (12) connecting chamber (3) to chamber (4) consist of an on-off valve (19) placed on the conduit (12) and connected to the electronic control unit (6), and a throat (13) which chokes the methane flow in transit.

7. Pressure regulator/reducer for feeding internal combustion engines with methane according to claim 1 characterized in that said sealing gaskets required for sealing are metal-to-metal seal type fixed within their seats.

8. Pressure regulator/reducer for feeding internal combustion engines with methane according to claim 1 characterized in that said sealing gaskets required for sealing are O-rings fixed in their seats.

9. Pressure regulator/reducer for feeding internal combustion engines with methane according to claim 1 wherein the stem (8) is integral with the elastic diaphragm (7) on one side and with the shutter (9) on the other side; said stem (8) has such a length that, when the elastic diaphragm (7) is in its resting position, the shutter (9) perfectly sticks to the walls of the opening (10) connecting chamber (4) to chamber (2), said walls of the opening (10) being provided with gaskets or metal-to-metal seals.

10. Pressure regulator/reducer for feeding internal combustion engines with methane according to claim 1 characterized in that the adjusting and/or closing devices of the conduit (12) allow to maintain the methane pressure within chamber (4) at minimum levels, therefore even lower than 1 bar when the engine request is minimum because travel conditions are extremely favorable.

* * * * *